US011991165B2

(12) United States Patent
Prasad et al.

(10) Patent No.: US 11,991,165 B2
(45) Date of Patent: May 21, 2024

(54) AUTHENTICATION METHOD FOR NEXT GENERATION SYSTEMS

(71) Applicant: NEC CORPORATION, Tokyo (JP)

(72) Inventors: Anand Raghawa Prasad, Tokyo (JP); Sivakamy Lakshminarayanan, Chennai (IN); Sheeba Backia Mary Baskaran, Chennai (IN); Sivabalan Arumugam, Chennai (IN); Hironori Ito, Tokyo (JP); Takahito Yoshizawa, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/044,065

(22) PCT Filed: Apr. 2, 2019

(86) PCT No.: PCT/JP2019/014574
§ 371 (c)(1),
(2) Date: Sep. 30, 2020

(87) PCT Pub. No.: WO2019/194155
PCT Pub. Date: Oct. 10, 2019

(65) Prior Publication Data
US 2021/0144135 A1  May 13, 2021

(30) Foreign Application Priority Data

Apr. 6, 2018  (IN) .............................. 201811013305

(51) Int. Cl.
*G06F 7/04* (2006.01)
*G06F 15/16* (2006.01)
(Continued)

(52) U.S. Cl.
CPC .............. *H04L 63/083* (2013.01); *H04L 9/30* (2013.01); *H04L 63/166* (2013.01);
(Continued)

(58) Field of Classification Search
CPC ..... H04L 63/08; H04L 63/083; H04L 63/166; H04L 63/205; H04L 9/30; H04W 12/06; H04W 12/69
(Continued)

(56) References Cited

U.S. PATENT DOCUMENTS

| 2005/0021957 | A1  | 1/2005  | Gu |
| 2006/0280305 | A1* | 12/2006 | Bajko ..................... H04L 63/08 |
| | | | 380/270 |

(Continued)

FOREIGN PATENT DOCUMENTS

| JP | 2004-287492 A | 10/2004 |
| WO | 2006/134441 A1 | 12/2006 |

OTHER PUBLICATIONS

International Search Report of PCT/JP2019/014574 dated Jun. 25, 2019 [PCT/ISA/210].

(Continued)

*Primary Examiner* — Brandon Hoffman
*Assistant Examiner* — Samuel Ambaye
(74) *Attorney, Agent, or Firm* — Sughrue Mion, PLLC (57) ABSTRACT

The present disclosure relates to authentication methods supported by the User Equipment (UE) to the core network and authentication method (selected by the core network) to the UE. These can be used for negotiating any primary or secondary (or any) authentication method and are applicable when multiple authentication methods are supported at the UE and the network (authentication server). Further, the present disclosure also offers security solution to prevent modification or tampering of the parameters in the mechanisms in order to prevent attacks such as bidding-down, Denial of Service (DoS) and Man-In-The-Middle (MITM).

8 Claims, 7 Drawing Sheets

(51) Int. Cl.
*H04L 9/30* (2006.01)
*H04L 9/40* (2022.01)
*H04L 29/06* (2006.01)
*H04W 12/06* (2021.01)
*H04W 12/69* (2021.01)

(52) U.S. Cl.
CPC ........... *H04L 63/205* (2013.01); *H04W 12/06* (2013.01); *H04W 12/69* (2021.01)

(58) Field of Classification Search
USPC ............................................................. 726/7
See application file for complete search history.

(56) References Cited

U.S. PATENT DOCUMENTS

| | | |
|---|---|---|
| 2008/0065888 A1 | 3/2008 | Zheng et al. |
| 2011/0271326 A1 | 11/2011 | Liang |
| 2011/0314287 A1* | 12/2011 | Escott ................ H04W 12/041 713/171 |
| 2016/0183180 A1* | 6/2016 | Garcia Martin ...... H04W 48/18 370/328 |
| 2018/0199398 A1 | 7/2018 | Dao et al. |
| 2018/0227743 A1* | 8/2018 | Faccin ................... H04W 8/08 |
| 2019/0149521 A1 | 5/2019 | Jerichow |
| 2019/0223063 A1* | 7/2019 | Palanigounder .... H04W 12/041 |
| 2019/0261178 A1* | 8/2019 | Rajadurai ........... H04W 12/069 |

OTHER PUBLICATIONS

Written Opinion of PCT/JP2019/014574 dated Jun. 25, 2019 [PCT/ISA/237].
U.S. Office Action for U.S. Appl. No. 17/549,156, dated Dec. 9, 2022.
Anand R. Prasad et al., "3GPP 5G Security", Applied Science, Germany. 2018, 3GPP SA3 & Rapporteur, Munich University of Applied Sciences, Germany (Year:2018), pp. 1-22.
Office Action dated Apr. 5, 2023 issued in U.S. Appl. No. 17/549,156.
U.S Office Action for U.S. Appl. No. 17/549,156, dated Jul. 7, 2023.
US Office Action for U.S. Appl. No. 17/549,156, mailed on Oct. 26, 2023.

* cited by examiner

AUTHENTICATION METHOD FOR NEXT GENERATION SYSTEMS

CROSS REFERENCE TO RELATED APPLICATIONS

This application is a National Stage of International Application No. PCT/JP2019/014574, filed Apr. 2, 2019, claiming priority to Indian Patent Application No. 201811013305, filed Apr. 6, 2018, the contents of all of which are incorporated herein by reference in their entirety.

TECHNICAL FIELD

The present disclosure relates generally to wireless telecommunications, and, in particular embodiments, to authentication mechanisms for next generation systems in a bid to prevent modification or tampering of parameters associated with a User Equipment, UE.

BACKGROUND ART

Current 5G system supports more than one authentication method to authenticate the UE, but there is no mechanism to negotiate the authentication method between the UE and the network based on UE's capability. The "UE's authentication capability" here means the information regarding the authentication methods it supports. Without UE's authentication capability based negotiation, there is a possibility that the core network chooses an authentication method that is not supported by the UE. The EAP (Extensible Authentication Protocol) framework supports EAP-type negotiation. But, this negotiation is initiated by the UE only after the authentication type mismatch. This will involve the core network initiating UE authentication by a specific method, which will then be rejected by the UE. The UE has to initiate a new request indicating the methods that it supports in these two cases, for example, (a) RFC 3748 states that "The Response contains one or more authentication Types desired by the Peer, Type zero (0) is used to indicate that the sender has no viable alternatives". (b) The peer (UE) sends its preferred authentication types only when the server selects a method that is not supported by it. If the peer has no alternative method, type "0" is sent, leading to authentication failure.

These scenarios can either lead to authentication failure and/or result in additional message round trips (signaling overhead) between the UE and the core network (function(s)/entities) to re-register with the network. The subscription data does not contain information regarding authentication methods supported by the Mobile Equipment (ME). So, the authentication method selected by the Unified Data Management (UDM)/Authentication Credential Repository and Processing Function (ARPF) based on subscription data may not be supported by the ME.

Further, the current 5G system supports more than one authentication method to authenticate the UE, but there is no mechanism to negotiate the authentication method between the UE and the network based on the network's capabilities. The "network's authentication capability" means the information regarding the authentication methods it (hPLMN; the home Public Land Mobile Network (PLMN) to which the authentication server belongs to) supports without network's authentication capability based negotiation, the UE does not know what authentication method is supported by the network. This could lead to unwanted signaling overhead when the UE tries to register with a network that does not support any of the authentication protocols implemented by it.

Figure 1:
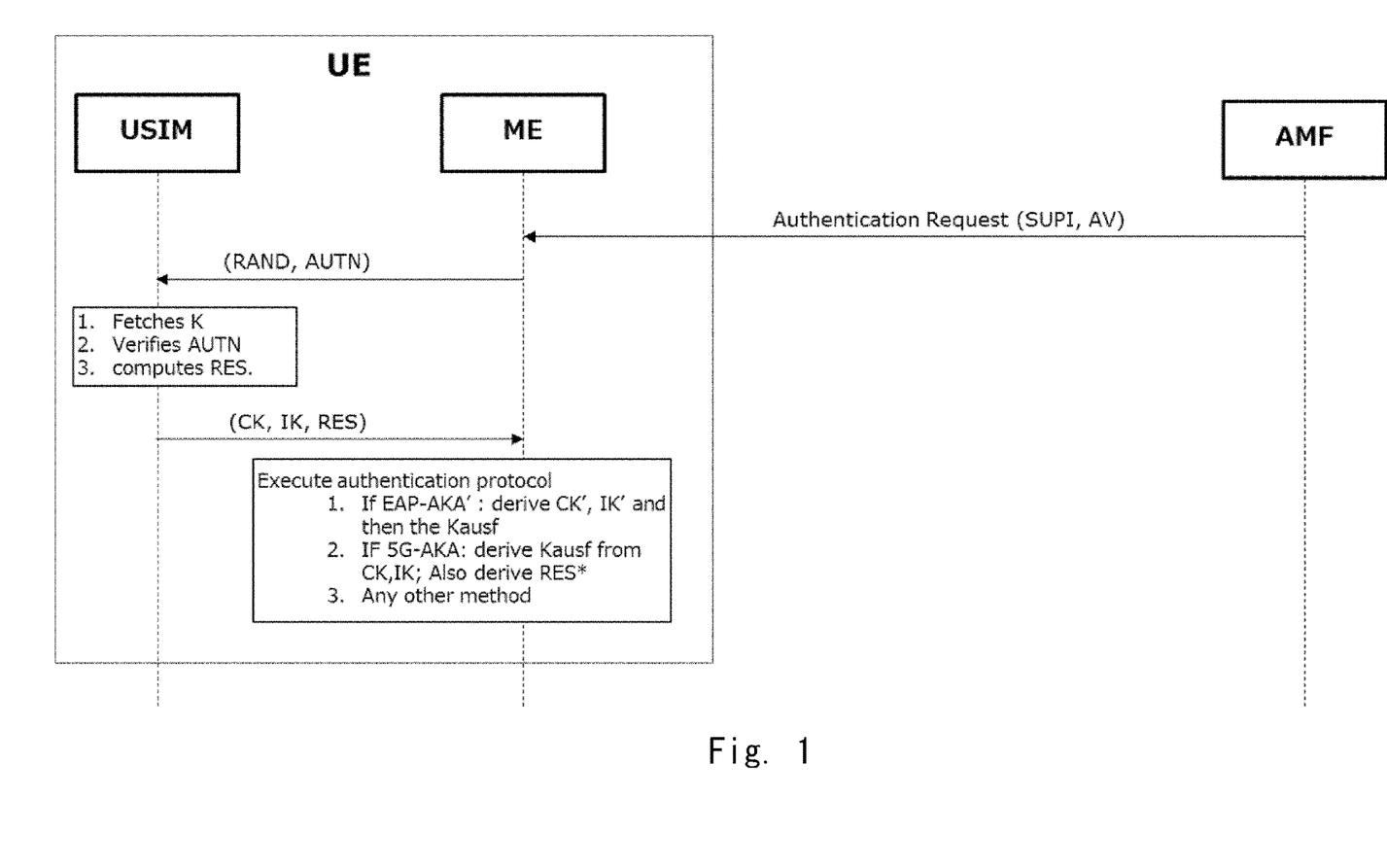
FIG. 1 illustrates interaction between Universal Subscriber Identity Module, USIM and a Mobile Equipment, ME in which the present disclosure is implemented.

Referring to FIG. 1, which illustrates the interaction between Universal Subscriber Identity Module (USIM) and ME, after the receipt of CK, IK from USIM, the ME has to execute the authentication protocol. Unless the authentication method selected by the UDM (or any core network function/entity) is not communicated to the ME, it will not know which authentication method to execute.

Thus, it is possible that the list of supported authentication method name(s)/type(s)/identifier(s) sent by the UE can be modified by a Man-In-The-Middle (MITM) or even compromised by any network functions. This could lead to a potential bidding down attack in which the attacker forces the network and the UE to negotiate a less secure authentication method. In Internet of Things (IoT)/Industrial IoT (IIoT) use-cases, the attacker may also cause a heavy-weight authentication protocol to be run thereby causing resource exhaustion.

Further, it is also possible that an attacker or a compromised or untrusted network function/entity in the visited network (visited Public Land Mobile Network (vPLMN)) modifies the name/type/identifier of the authentication method selected by the UDM and communicated to the UE. This will cause authentication to fail and can lead to Denial of Service (DoS) attack.

Therefore, the abovementioned techniques are limited in a manner as they are not able to ensure to prevent modification or tampering of the parameters in the mechanisms in order to prevent attacks such as bidding-down, DoS, and Man-In-The-Middle (MITM).

SUMMARY OF INVENTION

Technical Problem

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter.

Its sole purpose to present some concepts of the subject matter in a simplified form as a prelude to the more detailed description that is presented later.

It is therefore a primary objective of this disclosure is to prevent modification or tampering of the parameters in the mechanisms in order to prevent attacks such as bidding-down, Denial of Service (DoS) and Man-In-The-Middle (MITM).

It is an object of the present disclosure to provide authentication methods supported by the User Equipment (UE) to the core network and the authentication method (selected by the core network) to the UE. These methods can be used for negotiating any primary or secondary (or any) authentication method and are applicable when multiple authentication methods are supported at the UE and the network (authentication server).

Solution to Problem

According to an embodiment of the present disclosure, a method for securing authentication between a User Equipment, UE, and a network node is disclosed. The method comprises sending a plurality of identifiers to the network node, wherein the plurality of identifiers are supported by the UE and indicating at least one authentication measure for the network node; attaching a priority tag for each of the plurality of the identifiers; and sorting the plurality of identifiers based on the attached priority tag, wherein the attached priority tag indicates the order of UE's preference for securing the authentication.

Further, according to an embodiment of the present disclosure, the UE is configured to receive a plurality of identifiers supported by the network node in one of broadcasted mode or a pre-provisioned mode, select the authentication measure based on the parameter containing information, protect the parameter containing the authentication measure using a public key and a first key, and send the protected parameter to a core network to prevent unauthorized modification.

Yet, in another embodiment of the present disclosure, the network node is configured to select at least one authentication measure from based on the plurality of identifiers sent by the UE and the authentication measure selected by the network node is indicated to the UE based on at least one parameter. In this regard, the parameter is forwarded by a Mobile Equipment (ME) to Universal Subscriber Identity Module, USIM, in correspondence with the authentication measure used by the USIM with a specific procedure. Further, the parameter is protected by the network node and received by the UE upon protection, and wherein the parameter is protected based on a second key and a third key. The UE executes the authentication measure as indicated in the parameter from the network node. If other essential parameters or Information Elements (IEs) required to execute the protocol are not present in the message received from the network node (due to misconfigurations), the UE shall respond with the appropriate reject cause (e.g. "IEMissing", "IENotFound" etc).

According to an embodiment of the present disclosure, the UE is configured to store and use an identifier associated with the third key to identify at least one of an intermediate key generated upon authentication and related information, and instruct the network node to override the priority tag or the order of the list of authentication methods received in the parameter from the UE and respond with another preference. Based on the UEAuth_Cap parameter received from the UE, if the UDM/ARPF decides to override the priority tag or the order of the list of authentication methods received in the parameter from the UE, it responds with a mismatch tag with cause as "OverridePriority" or "PriorityMismatch". In this case, the UE has the choice to accept the method selected by the UDM or override it. If the UE decides to override the selected method, it responds with another preference.

According to another embodiment of the present disclosure, a method for securing authentication between a User Equipment (UE) and a network node is disclosed. The method comprises selecting an authentication measure based on a plurality of supported identifiers received from the UE and transmitting a plurality of identifiers to the UE in one of broadcasting mode or pre-provisioned mode, the selection is based on one of subscription data, type of access network, type of serving network, home network policies, the UE subscribed network or the type of UE.

Further, according to the embodiment of the present disclosure, the network node is configured to replay a parameter containing a plurality of supported authentication measure received and send a part of the parameter to the UE to ensure that it has been unchanged. In addition, the network node sends the part of the parameter to the UE upon protection, wherein the protection is based on a first key and a second key wherein the second key is stored in a server along with a third key and the third key is an identifier, set by one of the server or the network node, to identify the second key, and wherein the third key associates information for identification of at least one of the second key, a serving network, or a Subscription Permanent Identifier, SUPI.

In a further embodiment of the present disclosure, the network node is configured to send a mismatch tag to the UE corresponding to mismatch in capabilities of the network node. These and other objects, embodiments and advantages of the present disclosure will become readily apparent to those skilled in the art from the following detailed description of the embodiments having reference to the attached figures, the disclosure not being limited to any particular embodiments disclosed.

BRIEF DESCRIPTION OF DRAWINGS

The foregoing and further objects, features and advantages of the present subject matter will become apparent from the following description of exemplary embodiments with reference to the accompanying drawings, wherein like numerals are used to represent like elements.

It is to be noted, however, that the appended drawings along with the reference numerals illustrate only typical embodiments of the present subject matter, and are therefore, not to be considered for limiting of its scope, for the subject matter may admit to other equally effective embodiments.

DESCRIPTION OF EMBODIMENTS

Exemplary embodiments now will be described with reference to the accompanying drawings. The disclosure may, however, be embodied in many different forms and should not be construed as limited to the embodiments set forth herein; rather, these embodiments are provided so that this disclosure will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

It is to be noted, however, that the reference numerals in claims illustrate only typical embodiments of the present subject matter, and are therefore, not to be considered for limiting of its scope, for the subject matter may admit to other equally effective embodiments.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include operatively connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different. It is apparent to a person skilled in the art that the structure may also comprise other functions and structures.

Also, all logical units described and depicted in the figures include the software and/or hardware components required for the unit to function. Further, each unit may comprise within itself one or more components which are implicitly understood. These components may be operatively coupled to each other and be configured to communicate with each other to perform the function of the said unit.

Figure 2:
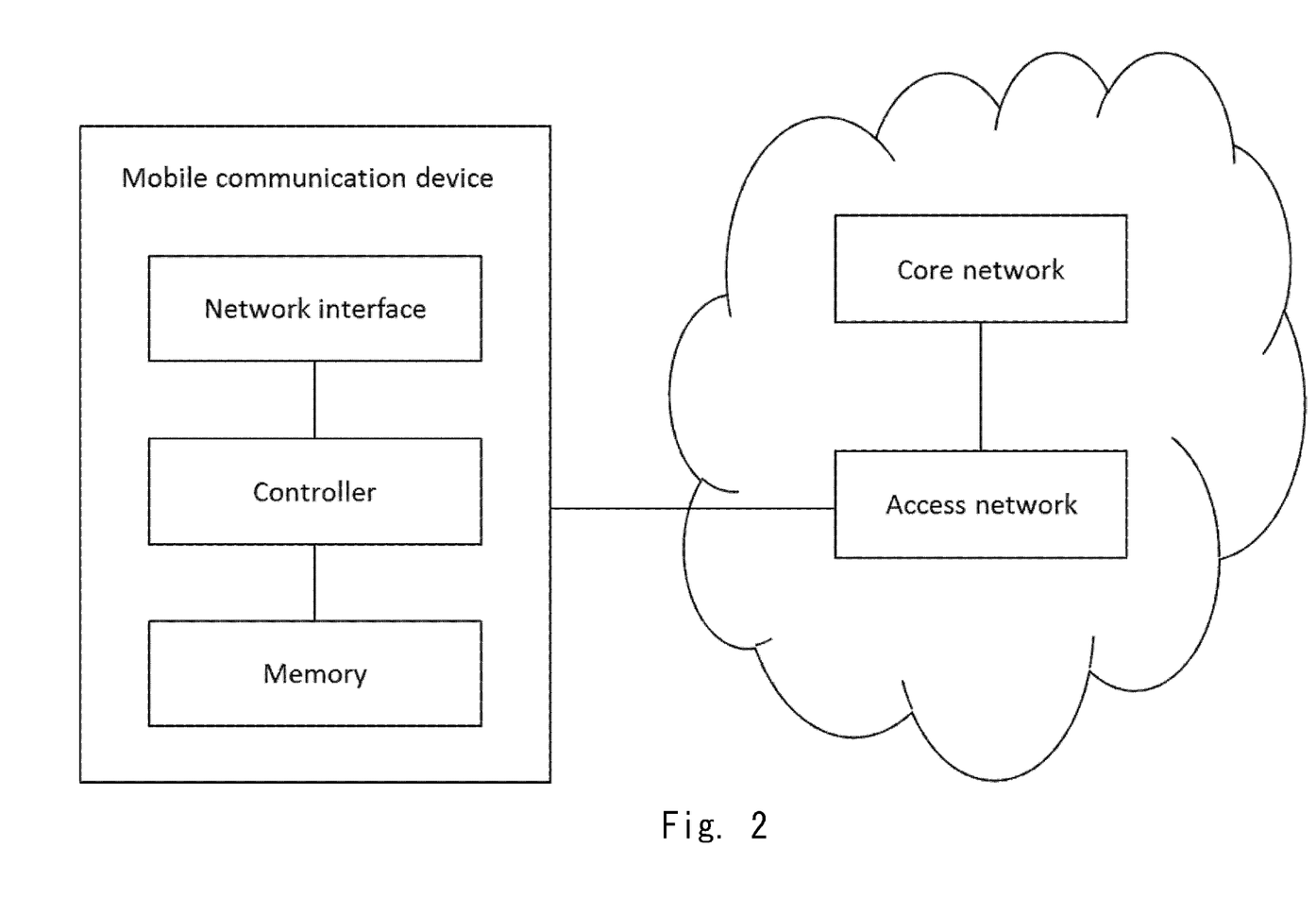
FIG. 2 illustrates a mobile communication environment according to an embodiment of the present disclosure.

FIG. 2 is a block diagram illustrating a mobile communication environment according to an embodiment of the disclosure. In the mobile communication environment, the mobile communication device is wirelessly connected to the service network for obtaining mobile communication services. For example, the mobile communication device may be a user equipment (UE), a mobile phone, a smartphone, a laptop computer, a panel PC, an IoT (Internet of Things) device, or any computing device supporting at least a Radio Access Technology (RAT) utilized by the service network. The RATs includes the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA 2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, Time Division-LTE (TD-LTE) technology, or next generation (5G) technology and others. The service network comprises an access network and a core network, wherein the access network is responsible for processing radio signals, terminating radio protocols, and connecting the mobile communication device with the core network, and the core network is responsible for performing mobility management, network-side authentication, and interfaces with public networks. In one embodiment, the service network may belong to a PLMN, the access network may include multiple RAs or TAs, wherein each RA or TA is formed by a group of base stations.

For example, if the service network is a WCDMA system, the access network may be a Universal Terrestrial Radio Access Network (UTRAN) which includes at least a Node-B (NB) and a Radio Network Controller (RNC), and the core network may be a General Packet Radio Service (GPRS) core which includes a Home Location Register (HLR), at least one Serving GPRS Support Node (SGSN), and at least one Gateway GPRS Support Node (GGSN). Alternatively, if the service network is an LTE/LTE-A system, the access network may be an Evolved-UTRAN (E-UTRAN) which includes at least an evolved NodeB (eNB), and the core network may be an Evolved Packet Core (EPC) which includes a Home Subscriber Server (HSS), Mobility Management Entity (MME), Serving Gateway (S-GW), and Packet Data Network Gateway (PDN-GW or P-GW). Further alternatively, if the service network is a next generation system (5GS), the access network may be a SG-Access Network (5G-AN) or (Radio) Access Network ((R)AN) which includes at least one gNB, and the core network may be a 5G Core Network (5GC) which includes an Access and Mobility Management Function (AMF), Security Anchor Function (SEAF), Authentication Server Function (AUSF), Unified Data Management (UDM), Subscription Identifier De-concealing Function (SIDF), and Authentication Credential Repository and Processing Function (ARPF). The gNB or other nodes in the access network may be an access network node. The AMF, SEAF, AUSF, UDM, SIDF, ARPF or other nodes in the core network may be a core network node. The access network node or the core network node may be a network node.

Embodiment 1

Figure 3:
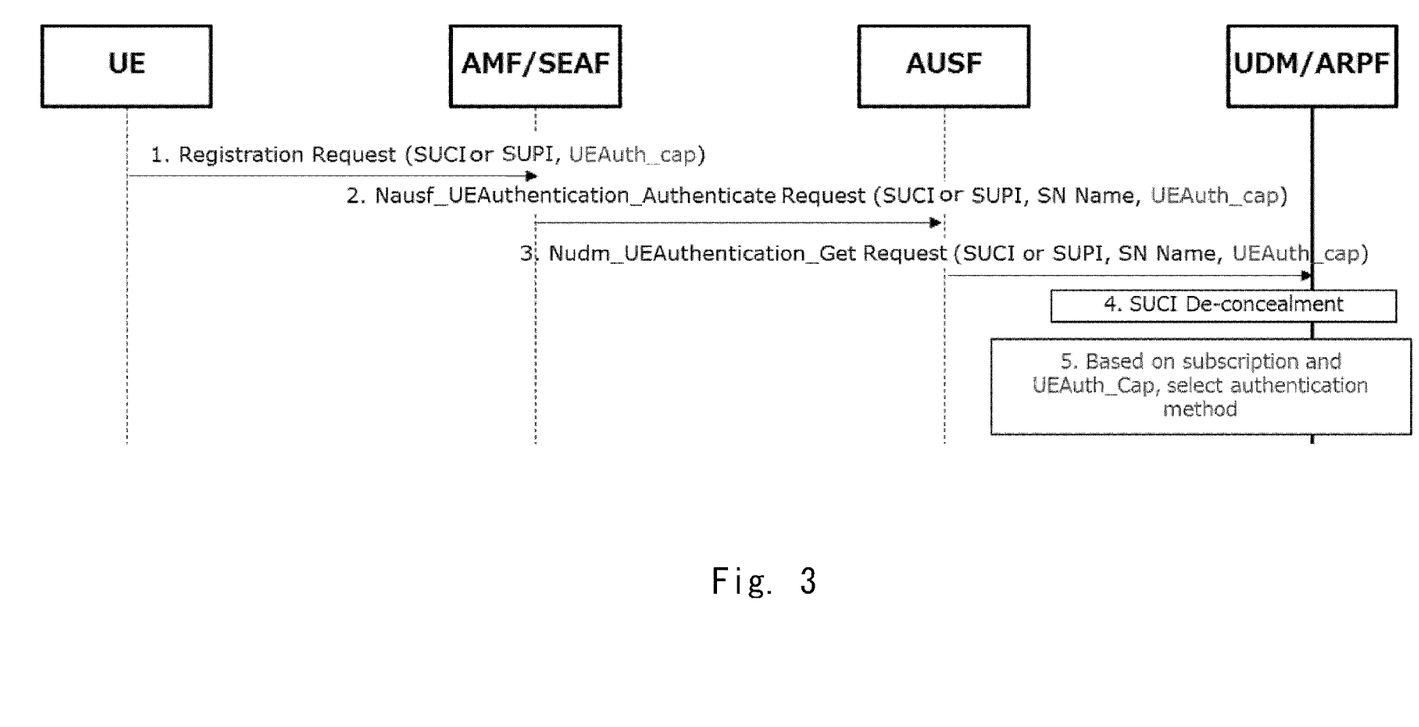
FIG. 3 shows UE-based authentication method selection using UE Authentication Capability (UEAuth_cap) parameter in accordance with the present disclosure.

In this variant illustrated in FIG. 3, the UE sends the UEAuth_Cap parameter (consisting of a list of authentication method type(s)/name(s)/identifier(s) supported by it) to the core network (AMF/SEAF) via the access network in the Registration or Attach Request message. The core network function/entities shall forward this parameter to the UDM/ARPF. The UDM/ARPF selects an authentication method from the list of supported methods mentioned in the UEAuth_Cap parameter.

The operation starts as the UEAuth_Cap parameter has been sent to an Access and Mobility Management Function (AMF)/SEcurity Anchor Function (SEAF) by the UE in a Registration request message or Attach request message. The SEAF/AMF includes the UEAuth_Cap parameter in the Nausf_UEAuthentication_Authenticate Request to an AUSF (AUthentication Server Function). The AUSF sends the UEAuth_Cap parameter in the Nudm_UEAuthentication_Get Request to UDM/ARPF. On receiving the Nudm_UEAuthentication_Get Request, the UDM/ARPF de-conceals the SUCI. The UDM/ARPF selects an authentication method from the UEAuth_Cap parameter. This decision could also consider subscription data of the UE. The selection of authentication method can also depend on network slices (NSSAI) that the UE is subscribed to, type of access network, type of serving network, type of UE (eg. EAP-TLS or any other light-weight EAP-based or non-EAP-based authentication protocol is chosen, if implemented at the UE, for IoT and IIoT devices), priority of the authentication method or the like. In such cases, the authentication method selection policy in the UDM/ARPF is also done based on the trust level on the vPLMN from which UE has initiated Registration Request.

The AUSF (authentication server for EAP methods) can also select an authentication method from the UEAuth_Cap parameter. In this case, the selected authentication method name/type/identifier alone is sent and update the list of authentication methods in the UEAuth_Cap parameter based on the methods supported by it before sending the UEAuth_Cap parameter to the UDM/ARPF.

Embodiment 2

According to this embodiment, the UE sends the authentication method type(s)/name(s)/identifier(s) (supported by it) as a part of the UE 5G security capabilities to the core network (AMF/SEAF) via the access network in the Registration or Attach Request. The core network function/entities shall forward this parameter to the UDM/ARPF. The UDM/ARPF selects an authentication method from the list of supported authentication method type(s)/name(s)/identifier(s) in the UE 5G security capabilities.

Further, if the core network does not support any of the authentication methods specified in the "UEAuth_Cap" parameter or the UE 5G Security capabilities, the core network shall initiate a message to the UE indicating the mismatch. This message shall contain the mismatch cause (eg. "NoAuthMethod Support" or a number that indicates mismatch in support for authentication method).

Furthermore, if the core network supports more than one of the authentication methods implemented at the UE but prefers to select a lower priority method over a higher-priority method (i.e. override the priority set by the UE) due to local policy or any reason, it shall indicate this in the <mismatch> tag. The mismatch cause shall indicate this using strings such as "OverridePriority" or "PriorityMismatch". The network shall also send the authentication method(s) that it prefers in a parameter similar to "NetAuth_Cap" as defined. The UE then responds with one of the authentication methods chosen from the methods in "NetAuth_Cap". This is applicable for all situations, not just a mismatch in priority, in which the core network may choose a different algorithm than what were specified by the UE.

The "NetAuth_Cap" parameter consisting of list of supported authentication method type(s)/name(s)/identifier(s) supported by the core network may be set for each entry in the list. The list may be ordered based on priority or a priority tag.

Option 1: The core network broadcasts the "NetAuth_Cap" parameter

The core network shall broadcast the "NetAuth_Cap" parameter consisting of Network Authentication Capabilities to all the UEs. This can be done as follows. When the RAN node (3GPP or non-3GPP access) registers with the core network, the core network Option 2: "NetAuth_Cap" pre-provisioned at the UE "NetAuth_Cap" parameter consisting of list of authentication methods supported by the home network (hPLMN) is pre-provisioned at the UE. In such a case, it is most likely that the "NetAuth_Cap" parameter is provisioned in the USIM. The USIM shall send this value to the ME. The ME can consider the "NetAuth_Cap" and its authentication method capabilities to construct the "UEAuth_Cap" parameter. For a UE that uses embedded SIMs (eSIMs) for credential storage and processing, the "NetAuth_Cap" parameter may be pre-provisioned or provisioned Over-The-Air (OTA).

The network may choose to confirm with the UE on which authentication method to choose before actually initiating authentication. Generally, the decision made by the network is taken as final. However, there may be certain cases in which the decision by the UE may be given more importance.

The Authentication method selected by the UDM/ARPF based on subscription data and UEAuth_Cap parameter or the authenticated method type(s)/name(s)/identifier(s) sent in UE 5G security capabilities is indicated to the UE as a part of the "Selected AuthMethod" parameter. This "Selected AuthMethod" parameter contains type/name/identifier of the authentication method selected by the UDM/ARPF. The "Selected AuthMethod" parameter has names as AuthMethod-ID, AuthMethod name, Auth-Type, Auth-ID, Auth-name.

Figure 4:
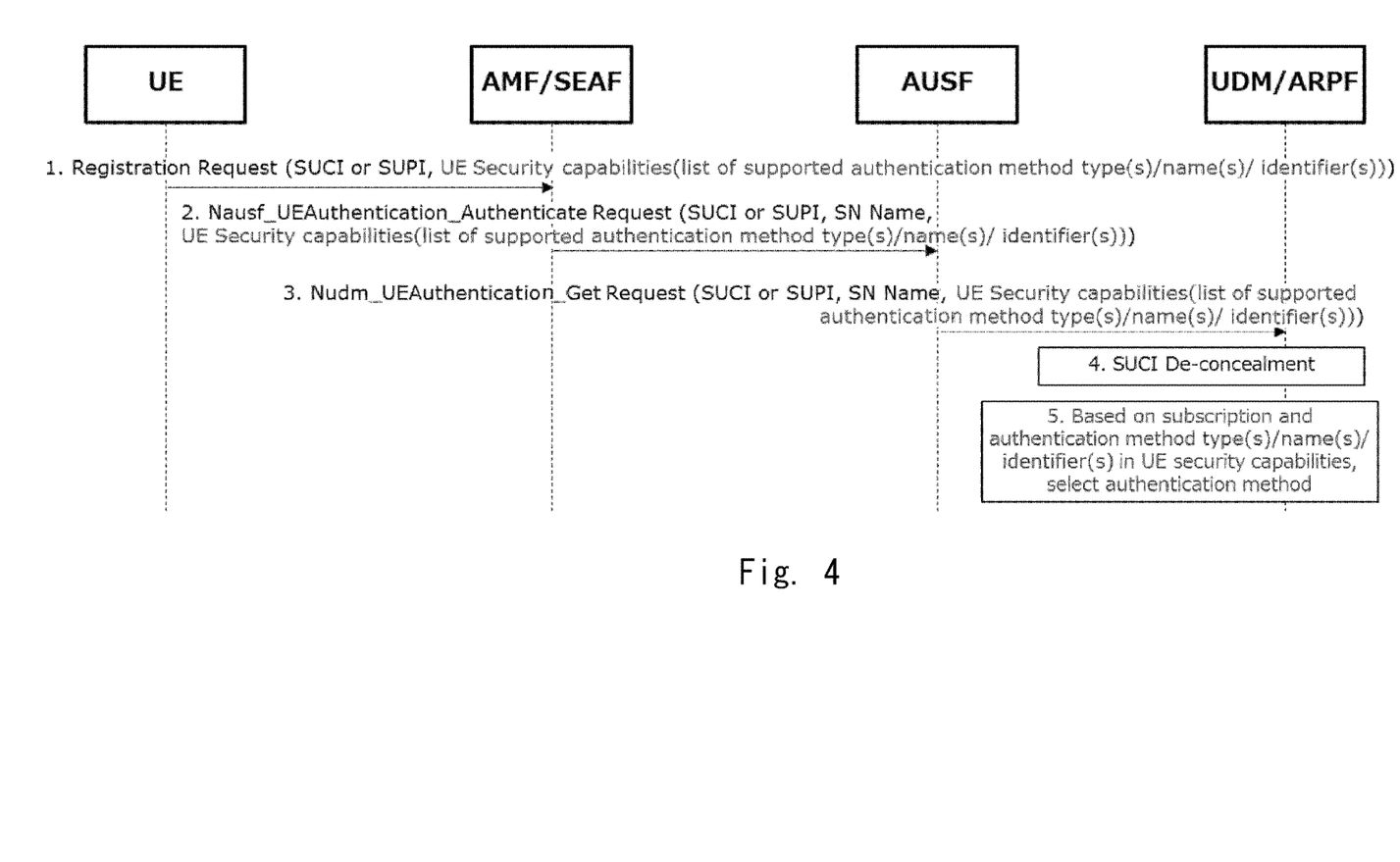
FIG. 4 shows UE-based authentication method selection using UE 5G Security capabilities parameter in accordance with the present disclosure.

In reference to FIG. 4, the list of authentication method type(s)/name(s)/identifier(s) has been sent to an Access and Mobility Management Function (AMF)/SEcurity Anchor Function (SEAF) via the access network by the UE in a Registration request message or Attach request message as a part of the UE 5G security capabilities parameter. The SEAF/AMF forwards this parameter in the Nausf_UEAuthentication_Authenticate Request to an AUSF (AUthentication Server Function). The AUSF sends the parameter in the Nudm_UEAuthentication_Get Request to UDM/ARPF. On receiving the Nudm_UEAuthentication_Get Request, the UDM/ARPF de-conceals the SUCI. The UDM/ARPF selects an authentication method from the list of authentication method type(s)/name(s)/identifier(s) in the UE 5G security capabilities. This decision could also consider subscription data of the UE and/or the authentication method priority of the UE.

Further, the AUSF (authentication server for EAP methods) can also select an authentication method from the UE 5G security capabilities parameter. In this case, the selected authentication method name/type/identifier alone is sent and the UDM/ARPF updates the list of authentication methods in the UE 5G security capabilities parameter based on the methods supported by it.

Figure 5:
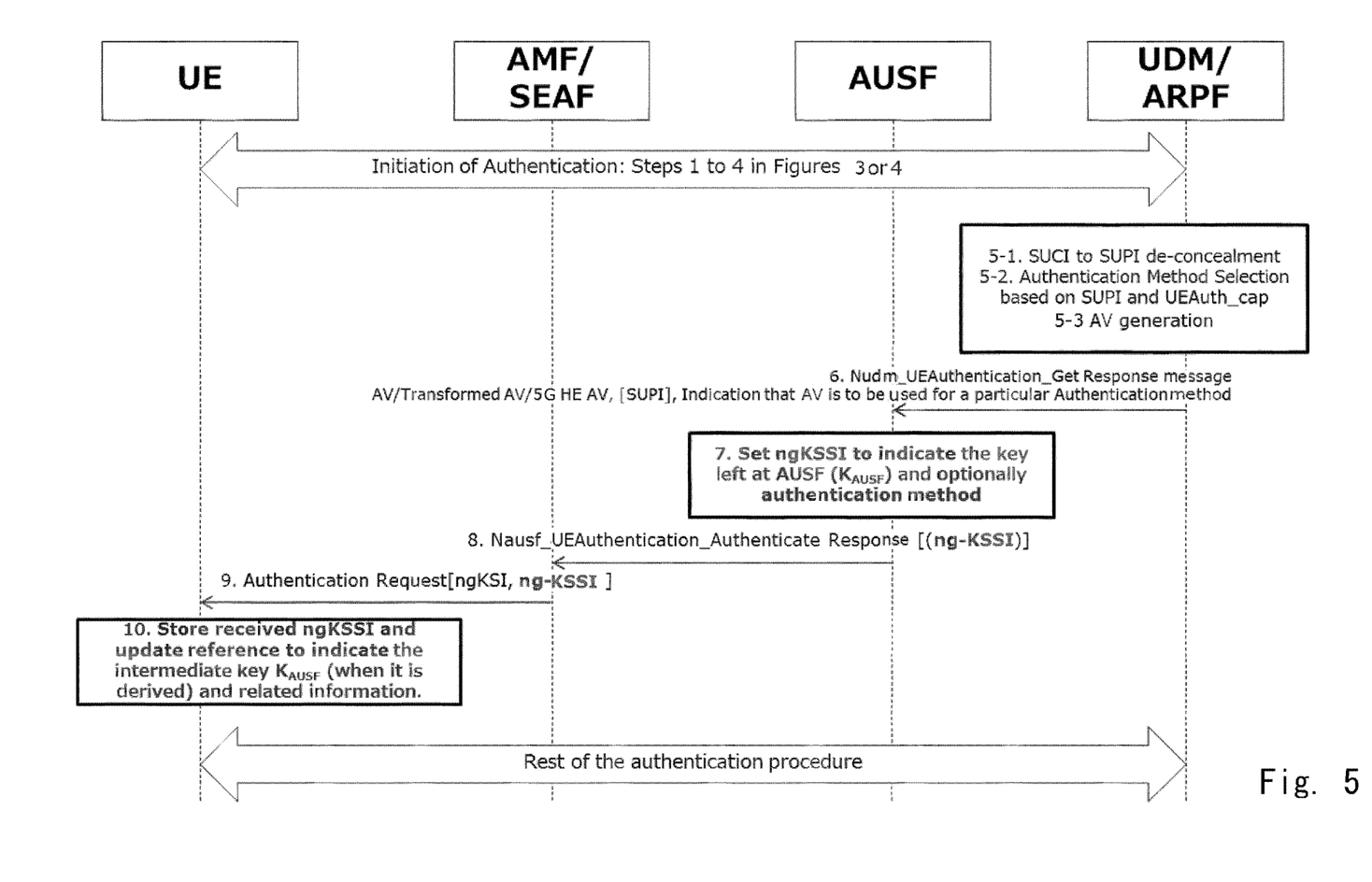
FIG. 5 shows a Key set source identifier setting in 5G (ngKSSI) and sending to UE by AUSF in accordance with the present disclosure.

FIG. 5 illustrates about the details of identification of the $K_{AUSF}$ derived by the core network, upon selection of the authentication. In 5G system, during primary or any other authentication phase, once the authentication method is selected by the UDM/ARPF in 5G core network, the $K_{AUSF}$ is either sent to the AUSF by the UDM/ARPF or the $K_{AUSF}$ is derived at the AUSF. In both cases, the AUSF needs to store the $K_{AUSF}$ and set the ngKSSI (Key Set Source Identifier in 5G) or any other identifier to identify the $K_{AUSF}$ (key left at AUSF) and the related information. The ngKSSI shall also be bound to the authentication method id/type/name that was used to derive $K_{AUSF}$. The AUSF can send the ngKSSI or the identifier it set, either during the authentication or after the successful authentication to identify the key left at AUSF, to the UE to identify the key $K_{AUSF}$. If the AUSF sends the ngKSSI or the identifier it set to the UE during authentication, the UE shall store the received ngKSSI and shall use the stored ngKSSI to identify the $K_{AUSF}$ derived after the successful authentication.

Further, the ngKSSI sent by the AUSF to UE through AMF/SEAF will be stored and used by the UE to identify the intermediate key $K_{AUSF}$ that is created if the authentication is successful.

On the other hand, the ngKSSI or any identifier set by the AUSF can also be used by the AUSF and UE to identify the corresponding authentication method/type/scheme using which the $K_{AUSF}$ is derived.

The ngKSSI or any identifier set by the AUSF can also be used by the AUSF and UE to identify the corresponding serving network, authentication method/type/scheme associated with the $K_{AUSF}$ derivation.

The ngKSSI or any identifier to identify the $K_{AUSF}$ can be set by the UDM/ARPF and sent to the AUSF (to identify the $K_{AUSF}$ stored at the AUSF) and later on the $K_{AUSF}$ identification information is sent to the UE.

The ngKSSI or any identifier set by the AUSF shall also identify the $K_{SEAF}$ derived from it.

The ngKSSI or any identifier set by the AUSF can be an identifier that can be used by the AUSF and UE/USIM to refer or identify information related to the serving network/home network, SUPI, authentication type and related keys.

Figure 6A:
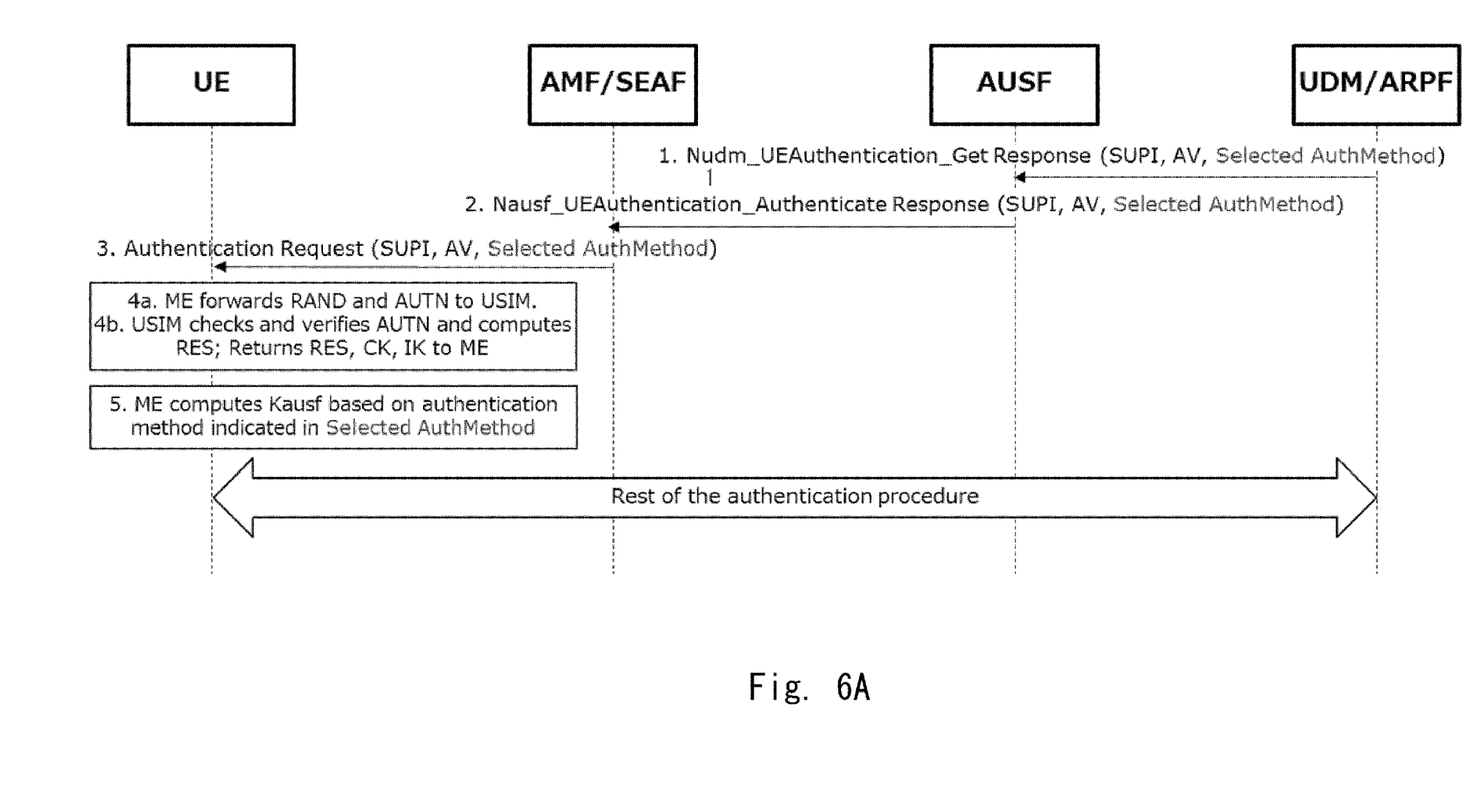
FIG. 6A illustrates a procedure to Indicate selected authentication procedure to the UE in accordance with the present disclosure.

In reference with FIG. 6A, the UDM/ARPF has selected an authentication method and the UDM shall include the "Selected AuthMethod" parameter in the Nudm_UEAuthentication_Get Response. The AUSF forwards the "Selected AuthMethod" parameter to the AMF/SEAF in the Nausf_UEAuthentication_Authenticate Response message. The AMF/SEAF forwards the "Selected AuthMethod" parameter to the UE in the Authentication Request message. The ME forwards the RAND and AUTN in the AV to the USIM. The USIM shall verify the freshness of the authentication vector by checking whether AUTN can be accepted or not. The USIM computes a response RES. The USIM shall return RES, CK, IK to the ME. The ME computes the $K_{AUSF}$ based on the authentication method indicated in the "Selected AuthMethod" parameter.

Figure 6B:
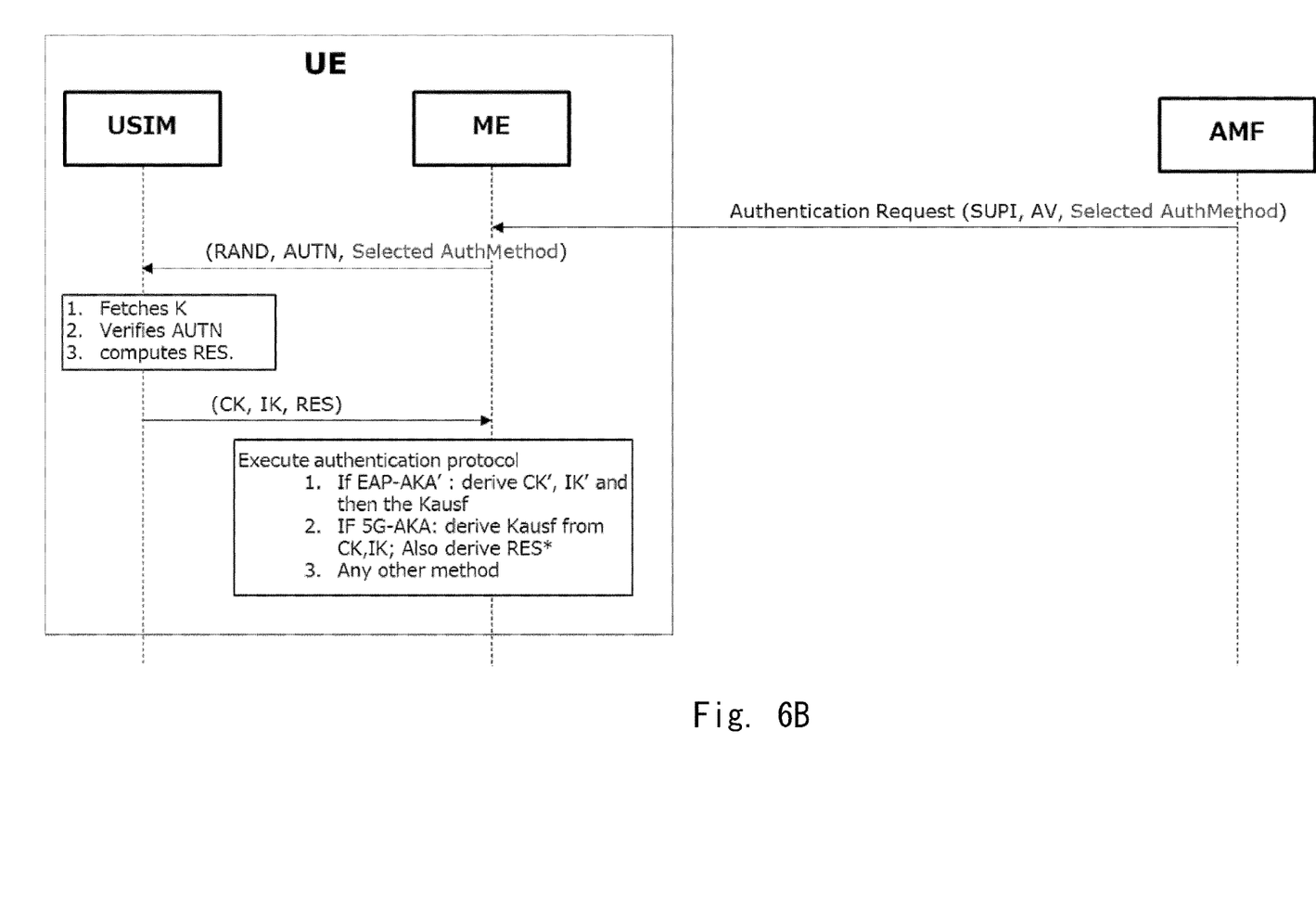
FIG. 6B illustrates a procedure to Indicate selected authentication method from the ME to USIM in accordance with the present disclosure.

Further, if the derivation of RES (or any procedure in the USIM) is dependent on the authentication method, the ME shall forward the "Selected AuthMethod" parameter to the USIM along with the RAND and AUTN, as shown in FIG. 6B.

Sending Only Non-Mandatory Authentication Method Name(s)/Type(s)/Identifier(s) Supported by the UE to the Network In this case, only the list of non-mandatory authentication method name(s)/type(s)/identifier(s) supported by the UE are sent to the core network. The core network may choose any method from the pool of mandatory methods and the non-mandatory methods implemented at the UE.

Priority of the Authentication Method Name(s)/Type(s)/Identifier(s) Supported by the UE to the Network As mentioned previously, the list of the authentication method name(s)/type(s)/identifier(s) supported by the UE can be ordered based on priority. The order of the list indicates the order of UE's preference of the authentication method. This is also applicable to the "NetAuth_Cap" parameter. The list can also contain each method name/type/identifier along with a priority tag. The priority tag is the precedence number of the authentication method with higher priority that is given more precedence by the core network.

Further, the Authentication method capabilities (UEAuth_Cap or list of supported method type(s)/name(s)/identifier(s)) sent by the UE to the network to assist Authentication method selection shall be replayed by the network to the UE after security establishment. The secure message used to replay the capabilities could be NAS Security Mode Command sent from the AMF/SEAF to the UE or Registration Accept message from AMF/SEAF to the UE. The replayed parameter containing the Authentication method capabilities is verified by the UE. In case of any deviation/modification in the received parameter, the UE must notify the hPLMN regarding possible MITM or bidding down attacks.

The Hash of the parameter/Information Element (IE) containing Authentication method capabilities is sent to the UE by the network. The UE also calculates the HASH of the parameter it had sent and verifies that the computed HASH is the same as the HASH received from the network.

With virtualization of network functions, it is of utmost importance that one network function does not modify sensitive information before sending it to another network function. To prevent this, the Authentication method capabilities sent by the UE must be protected using HN Public key and the root key 'K' or any key derived from it. Regarding the HN public key, the UE encrypts the UEAuth_Cap parameter or any IE carrying the UE's authentication capabilities using the HN public key. The UDM/ARPF at the hPLMN decrypts this parameter using the HN private key. The use of HN public key is optional. The protection of Authentication method capabilities using HN public key depends on whether the UE and/or the network support privacy activation or not. Regarding the root key 'K' the UE uses the key 'K' or any key derived from it as the shared secret key to encrypt the parameter carrying the Authentication method capabilities. In addition, the core network may also use SUCI and/or SUPI as parameters while encrypting or integrity protecting the parameter/IE carrying the information on authentication methods supported by the UE. In case, the UE is already authenticated and wants to initiate a registration via another access type, the parameter/Information Element (IE) containing the Authentication method capabilities shall be encrypted using the current security context (partial ciphering of the parameter/IE in the Registration Request). If the "NetAuth_Cap" is sent OTA, then it should be integrity protected and optionally encrypted, if the security context exists.

In addition, "Selected AuthMethod" parameter to indicate the selected authentication method/protocol to the UE). The "Selected AuthMethod" parameter can be encrypted using the root key 'K' or a key derived from it and the $K_{AUSF}$ or a key derived from it. This way, the network functions/entities cannot modify the "Selected AuthMethod" parameter.

Advantages

The present disclosure offers authentication methods supported by the User Equipment (UE) to the core network and authentication method (selected by the core network) to the UE. These methods can be used for negotiating any primary or secondary (or any) authentication method and are applicable when multiple authentication methods are supported at the UE and the network (authentication server).

As will be appreciated by one of skill in the art, the present disclosure may be embodied as a method, and apparatus. Accordingly, the present disclosure may take the form of an entirely hardware embodiment, a software embodiment or an embodiment combining software and hardware aspects.

It will be understood that each block of the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In the drawings and specification, there have been disclosed exemplary embodiments of the disclosure. Although specific terms are employed, they are used in a generic and descriptive sense only and not for purposes of limitation, the scope of the disclosure being defined by the following claims.

For example, some or all of the example embodiments disclosed above can be described as, but not limited to, the following supplementary notes.

(Supplementary Note 1)

A method for securing authentication between a User Equipment (UE) and a network node, the method comprising:

sending a plurality of identifiers to the network node, wherein the plurality of identifiers are supported by the UE and indicating at least one authentication measure for the network node; and attaching a priority tag for each of the plurality of identifiers.

(Supplementary Note 2)

The method as claimed in Supplementary Note 1 further comprising: sorting the plurality of identifiers based on the attached priority tag, wherein the attached priority tag indicates the order of UE's preference for securing the authentication.

(Supplementary Note 3)

The method as claimed in Supplementary Note 1, wherein the network node is configured to select at least one authentication measure from based on the plurality of identifiers sent by the UE.

(Supplementary Note 4)

The method as claimed in Supplementary Note 1, wherein the authentication measure selected by the network node is indicated to the UE based on at least one parameter.

(Supplementary Note 5)

The method as claimed in Supplementary Note 4, wherein the parameter is forwarded by a Mobile Equipment to Universal Subscriber Identity Module, USIM, in correspondence with the authentication measure used by the USIM with a specific procedure.

(Supplementary Note 6)

The method as claimed in Supplementary Note 4, wherein the UE is configured to:

receive a plurality of identifiers supported by the network node in one of broadcasted mode or a pre-provisioned mode, and select the authentication measure based on the parameter containing information.

(Supplementary Note 7)

The method as claimed in Supplementary Note 6, wherein the UE is configured to:

protect the parameter containing the authentication measure using a public key and a first key, and send the protected parameter to a core network to prevent unauthorized modification.

(Supplementary Note 8)

The method as claimed in Supplementary Note 7, wherein the parameter is protected by the network node and received by the UE upon protection, and wherein the parameter is protected based on a second key and a third key.

(Supplementary Note 9)

The method as claimed in Supplementary Note 8, wherein the UE is configured to store and use an identifier associated with the third key to identify at least one of an intermediate key generated upon authentication and related information.

(Supplementary Note 10)

The method as claimed in Supplementary Note 1, wherein the UE is configured to instruct the network node to override the priority tag and respond with another preference.

(Supplementary Note 11)

A method for securing authentication between a User Equipment, UE, and a network node, the method comprising:

selecting an authentication measure based on a plurality of supported identifiers received from the UE; and transmitting a plurality of identifiers to the UE in one of broadcasting mode or pre-provisioned mode.

(Supplementary Note 12)

The method as claimed in Supplementary Note 11, wherein the selection is based on one of subscription data, type of access network, type of serving network, home network policies, the UE subscribed network or the type of UE.

(Supplementary Note 13)

The method as claimed in Supplementary Note 11, wherein the network node is configured to:

replay a parameter containing a plurality of supported authentication measure received; and send a part of the parameter to the UE to ensure that it has been unchanged.

(Supplementary Note 14)

The method as claimed in Supplementary Note 13, wherein the network node sends the part of the parameter to the UE upon protection, wherein the protection is based on a first key and a second key.

(Supplementary Note 15)

The method as claimed in Supplementary Note 14, wherein the second key is stored in a server along with a third key.

(Supplementary Note 16)

The method as claimed in Supplementary Note 15, wherein the third key is an identifier, set by one of the server or the network node, to identify the second key, and wherein the third key associates information for identification of at least one of the second key, a serving network, or a Subscription Permanent Identifier, SUPI.

(Supplementary Note 17)

The method as claimed in Supplementary Note 11, wherein the network node is configured to send a mismatch tag to the UE corresponding to mismatch in capabilities of the network node.

(Supplementary Note 18)

A system having a user equipment and a base station, implementing method steps claimed in any of method Supplementary Notes 1 to 10.

(Supplementary Note 19)

A system having a user equipment and a base station, implementing method steps claimed in any of method Supplementary Notes 11 to 17.

The invention claimed is:

1. A method of a terminal device, the method comprising:
   initiating, to an Access and Mobility Management Function/SEcurity Anchor Function (AMF/SEAF) node via an access network, a registration procedure for sending capability information of the terminal device related to an authentication method to cause an Unified Data Management (UDM) node to select the authentication method based on the capability information received from the AMF/SEAF node via an Authentication Server Function (AUSF) node; and
   receiving, from the UDM node via the AUSF node, the AMF/SEAF node and the access network, security information based on the authentication method selected by the UDM node.

2. The method as claimed in claim 1, wherein the registration procedure comprises sending, to the AMD/SEAF node via the access network, a Subscription Concealed Identifier (SUCI), a Serving Network (SN) name, and the capability information of the terminal device related to the authentication method.

3. A terminal device comprising:
one or more memories configured to store instructions; and
one or more processors configured to execute the instructions to:
initiate, to an Access and Mobility Management Function/SEcurity Anchor Function (AMF/SEAF) node via an access network, a registration procedure for sending capability information of the terminal device related to an authentication method to cause an Unified Data Management (UDM) node to select the authentication method based on the capability information received from the AMF/SEAF node via an Authentication Server Function (AUSF) node, and receive, from the UDM node via the AUSF node, the AMF/SEAF node and the access network, security information based on the authentication method selected by the UDM node.

4. The terminal device as claimed in claim 3, wherein the registration procedure comprises a Subscription Concealed Identifier (SUCI), a Serving Network (SN) name, and the capability information of the terminal device related to the authentication method.

5. The method as claimed in claim 1, wherein the capability information of the terminal device indicates at least one capability of the terminal device.

6. The terminal device as claimed in claim 3, wherein the capability information of the terminal device indicates at least one capability of the terminal device.

7. The method as claimed in claim 1, wherein the capability information indicates an authentication method supported by the terminal device.

8. The terminal device as claimed in claim 3, wherein the capability information indicates an authentication method supported by the terminal device.

\* \* \* \* \*